May 5, 1942.　　　　E. FAY ET AL　　　　2,282,176
METHOD AND APPARATUS FOR FORMING HELICAL LOCK SEAM PIPE
Filed May 2, 1939　　　　5 Sheets-Sheet 2

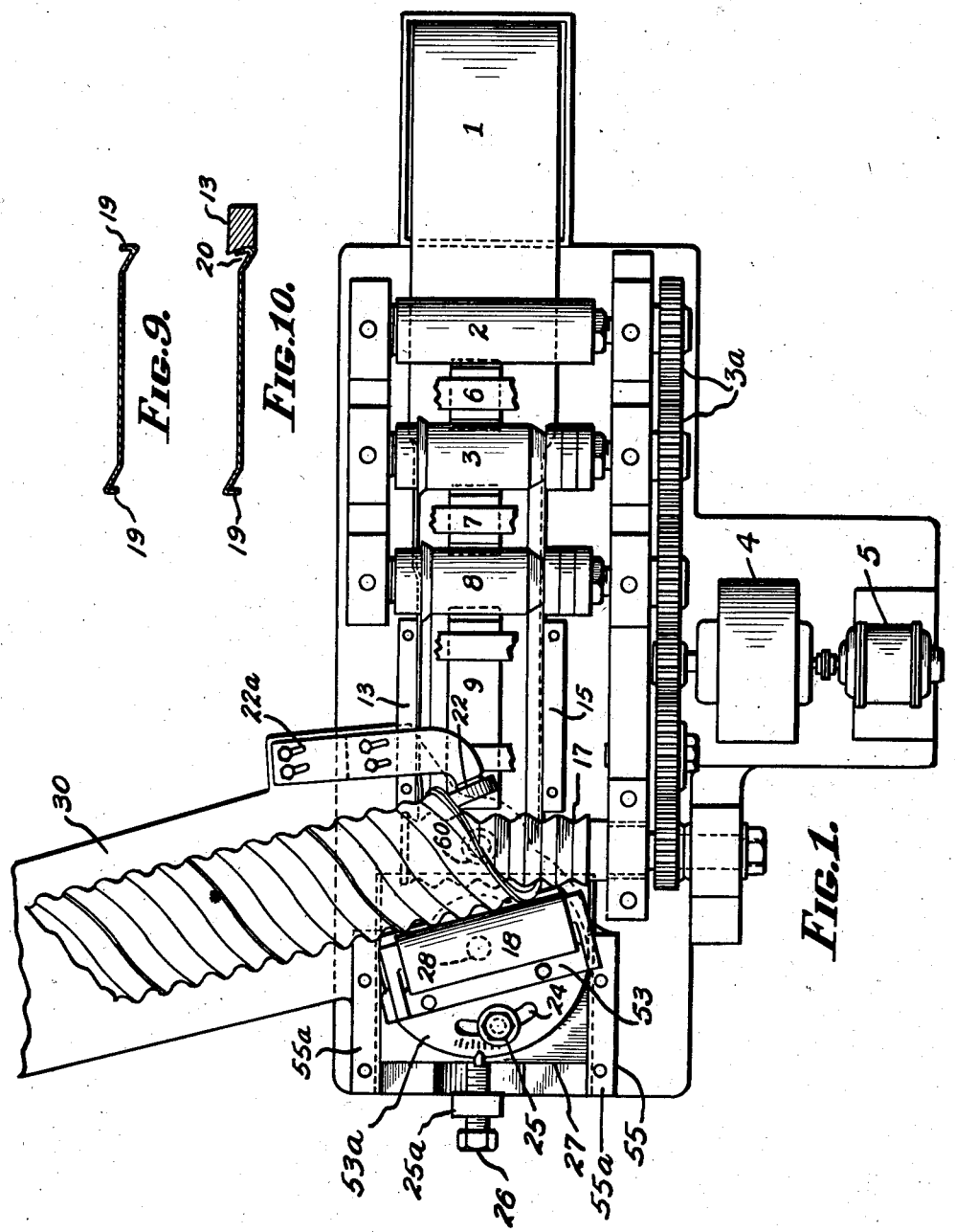

INVENTORS.
EUGENE FAY
AND
BY TERRENCE W. ALLSWORTH.
Allen & Allen
ATTORNEYS.

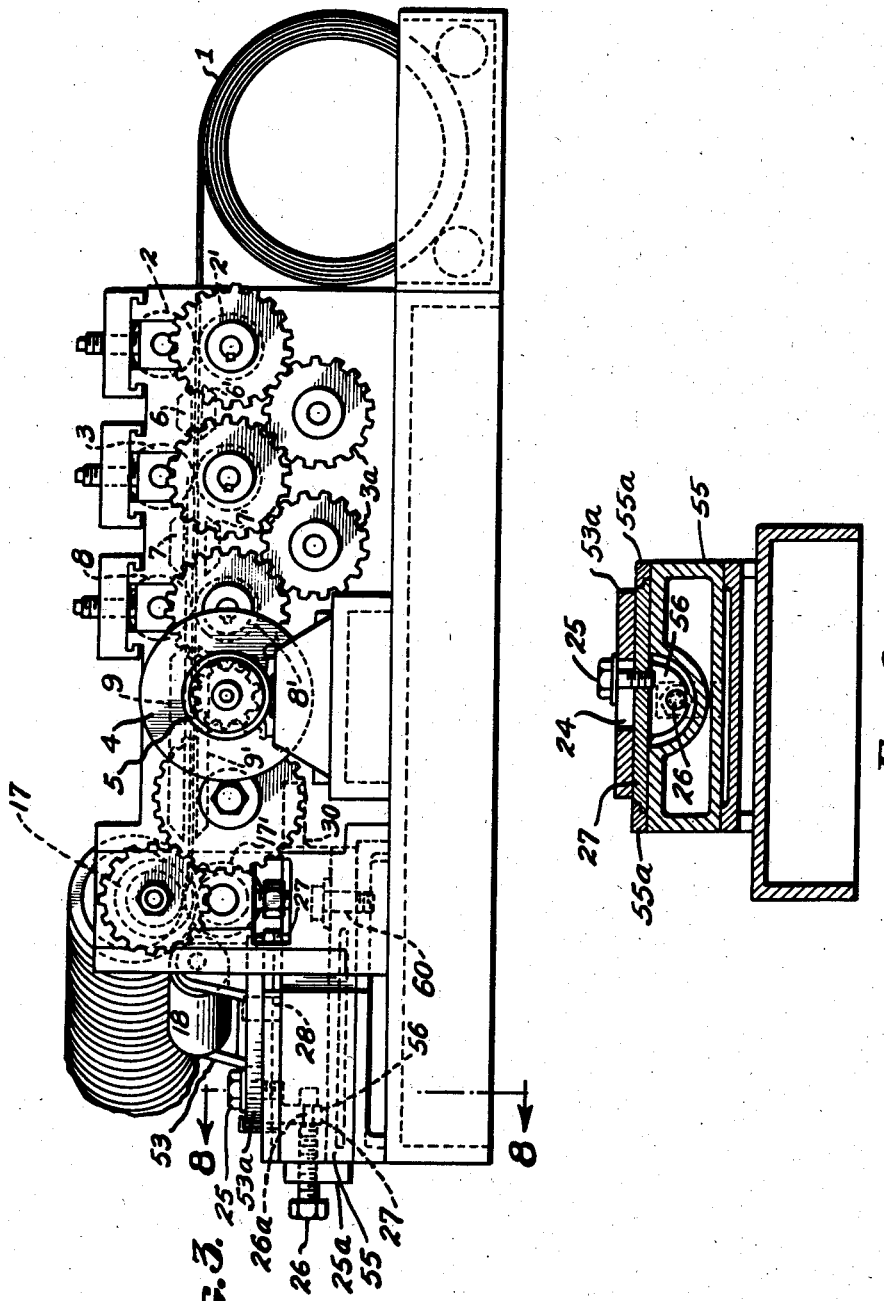

May 5, 1942.  E. FAY ET AL  2,282,176
METHOD AND APPARATUS FOR FORMING HELICAL LOCK SEAM PIPE
Filed May 2, 1939   5 Sheets-Sheet 4

INVENTORS.
EUGENE FAY
AND
BY TERRENCE W. ALLSWORTH.
Allen + Allen
ATTORNEYS.

May 5, 1942.     E. FAY ET AL     2,282,176
METHOD AND APPARATUS FOR FORMING HELICAL LOCK SEAM PIPE
Filed May 2, 1939     5 Sheets-Sheet 5
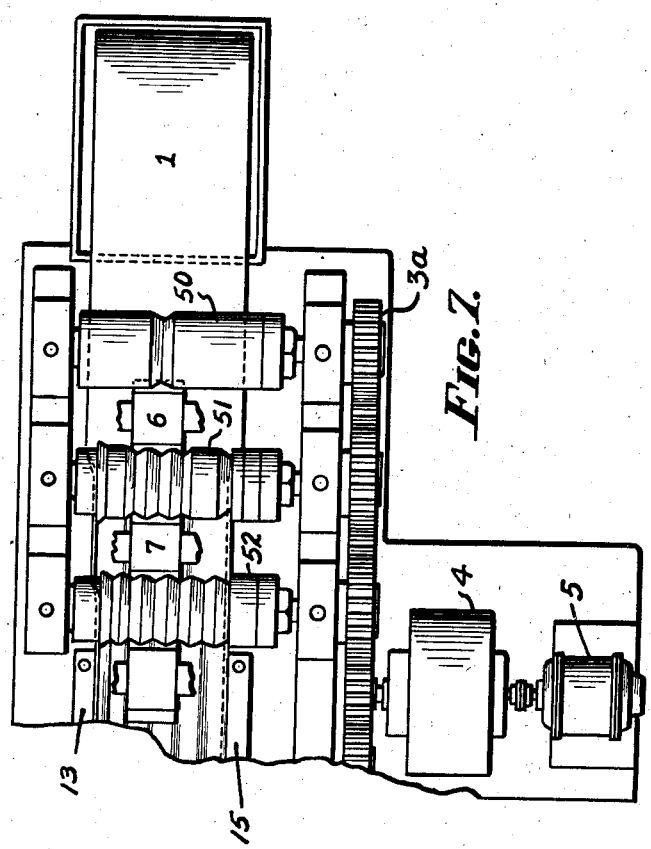
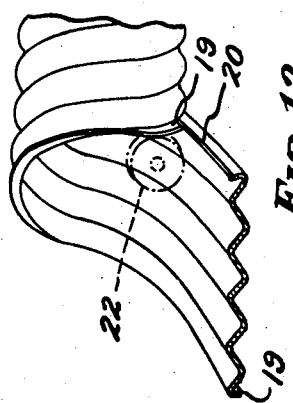
Inventors.
Eugene Fay
and Terrence W. Allsworth
By Allen & Allen
Attorneys.

Patented May 5, 1942

2,282,176

UNITED STATES PATENT OFFICE 2,282,176

METHOD AND APPARATUS FOR FORMING HELICAL LOCK SEAM PIPE

Eugene Fay and Terrence W. Allsworth, Middletown, Ohio, assignors to The American Rolling Mill Company, Middletown, Ohio, a corporation of Ohio Application May 2, 1939, Serial No. 271,308

13 Claims. (Cl. 113—35)

This invention relates to the manufacture of pipe which is known as helical lock seam pipe, and to a method of forming such pipe as well as to a machine for carrying out the method.

Numerous methods have been disclosed in the art for manufacturing pipe from strip by helically winding the strip and in some manner connecting contiguous edges to form some sort of a helical seam. Our invention relates more particularly to pipe in which the seam is formed by interengaging elements which are tightly clamped together. The pipe may be either smooth walled or by longitudinally corrugating the strip, the pipe may be given helical corrugations. Generally speaking, galvanized iron is used in the manufacture of such pipe.

In the case of light gauge culverts and the like, the metal is generally galvanized in strip form before it is manufactured into pipe; while in the case of heavier gauges, the galvanizing is often done after manufacturing. In the case of stock galvanized before forming, it is impossible to weld such edges together without burning off the galvanizing coating, and hence the so-called lock seaming method is preferred. Generally a lock seam is produced by bending a U shaped bead along one edge of the strip and an L shaped flange along the other, and as the material is curved into the helix the L shaped flange is guided into the U shaped bead and securely locked in place by means of rollers.

Numerous ways have been disclosed in the art for forming both flat stock and corrugated strip into the helix but most of these prior disclosures presuppose a strip of constant hardness and substantially without camber, and such strip is not commercially available. The best of commercial strip varies considerably in gauge and temper, and is always more or less cambered. Some attempts have been made to take care of irregularities in the strip, as for example Patents 2,136,942 and 2,136,943 in the name of Jonathan Roy Freeze.

Our invention relates to the manufacture of strip into pipe in a manner which is entirely different from anything which is known at the present time.

It is an object of our invention to provide a method of forming either flat or corrugated helical lock seam pipe in a simple and expeditious manner, whereby the pipe will have perfect seams.

It is another object of our invention to provide a machine which will accomplish the method and which will be capable of operating on strip of different widths, and which will be capable of producing pipe of different diameters. Furthermore, it is an object of our invention to provide a machine which will make tapered pipe.

There is currently a considerable demand for a light gauge and yet rigid and strong pipe which can be driven into the ground on a mandrel for use as a pile shell to be filled with concrete to form piling. For such uses corrugated pipe is of advantage in that it resists settling action under load. Furthermore experience and repeated tests have shown that if the pile tapers toward a point on the order of say 2 inches in 10 feet, or even one inch in 10 feet, that the load carrying capacity is increased considerably. It is therefore a further object of our invention to provide a machine and a method for manufacturing light gauge rigid tapered pipe which will be suitable for use as pile shells.

Generally our objects include the provision of a machine which will be extremely simple and much cheaper to manufacture than any machine now available, which will have less moving parts and which will be capable of turning out uniformly excellent pipe in either smooth walled or corrugated form, and either of constant diameter or with a slight taper.

These and other objects of our invention which will be described more in detail hereinafter, we accomplish by that series of method steps and by that construction and arrangement of parts, of which we shall now describe exemplary embodiments.

Reference is now made to the drawings forming a part hereof, and in which:

Figure 1 is a plan view of a machine according to our invention.

Fig. 3 is a side elevation of the machine as seen from the drive side.

Fig. 7 is a partial plan view similar to Fig. 1, showing corrugating rollers such as are used in the manufacture of heavier gauge pipe.

Fig. 8 is a cross-sectional view taken on the line 8—8 of Fig. 3.

Fig. 9 is a cross-sectional view of a flat strip after it leaves the seam element forming rolls used in the manufacture of light gauge pipe.

Fig. 10 is a view similar to Fig. 9 showing how one of the seam elements is turned over to form a U-shaped bead.

Fig. 11 is a cross-sectional view of the seam which is formed.

Fig. 12 is a perspective view showing a corrugated strip being formed into pipe, all forming apparatus being omitted to better illustrate the forming of the seam.

Figure 4:
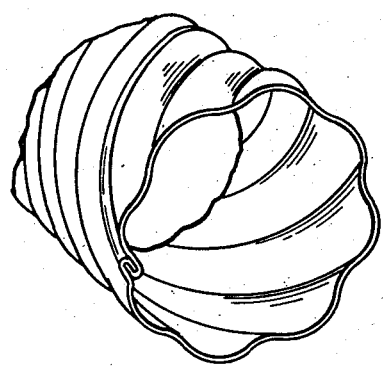
Fig. 4 is a perspective view of a section of finished pipe.

Briefly, in the practice of our invention we provide means for feeding strip and forming along the edges thereof seam elements. The corrugations which are to be provided in the finished pipe may be formed in the strip incident to the process of helically forming the strip into pipe. This is the preferable way of carrying out our process when relatively light gauge strip is being used. With heavier gauges this procedure would put too much of a strain on the apparatus, and it may therefore be desirable to introduce the corrugations into the strip gradually before it arrives at the forming assembly. The fundamental principles of pipe manufacture are the same in both cases, except that in the case of light gauge material the rollers 17 and 17' (Figs. 1 and 5) form the corrugations and perform the seaming operation, while in the case of heavier gauge strip the rollers 17 and 17' merely size the previously formed corrugations and perform the seaming operation. In either case the seam elements along the edges of the strip are formed as a preliminary operation.

In the interests of simplicity of presentation, we shall describe first the strip preparation, i. e., the operations carried out upon the strip before it enters the forming assembly.

Referring more particularly to Figs. 1 and 3, strip from a coil 1 is led through a pair of rolls 2, 2', which are journaled at their ends, the roll 2' being driven through the gear train 3a, and gear reducer 4 by the motor 5. After the strip leaves the rolls 2, 2', it passes between upper and lower guides 6, 6', and between another pair of rolls 3, 3', which are mounted and driven in a manner similar to the rolls 2, 2'. The material then passes through upper and lower guides 7 and 7', and through another set of rolls 8 and 8', which are mounted and driven in a manner similar to the rolls 2, 2' and 3, 3', and thence the strip passes through upper and lower guides 9, 9' to the forming unit, which will be described in more detail hereinafter.

It will be understood that the flat rollers 2, 2', 3, 3' and 8, 8' are the ones which we prefer to use in the manufacture of pipe from light gauge strip, and that these rollers have only the function of producing the seam elements along the edges of the strip. Where heavier gauge stock is being used we substitute rolls such as are shown at 50, 51 and 52 in Fig. 7, and as there shown the rolls not only produce the seam elements along the edges of the strip but also produce the longitudinal corrugations so as to lessen the strain on the forming assembly. The forming of the seam elements must begin far enough back in order that the deformation or change in shape of the strip can be brought about in progressive steps, in order to avoid stretching, and we have found it desirable to provide for at least two seam element forming steps before the strip reaches the pipe forming assembly.

Figure 6:
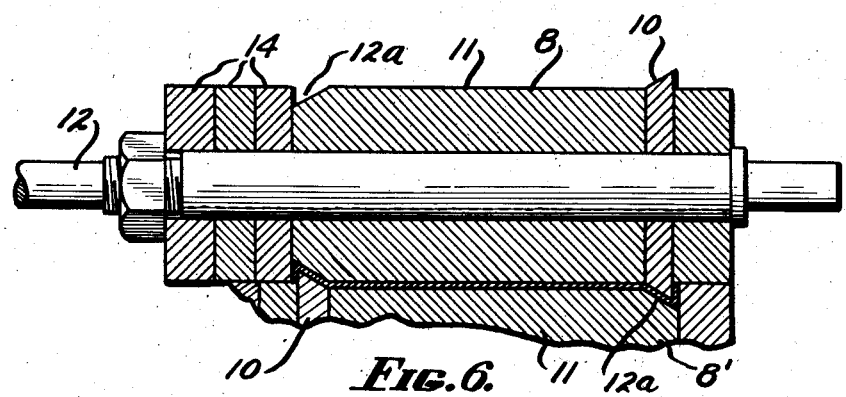
Fig. 6 is a partial cross-sectional view showing a pair of flange forming rolls as used in the manufacture of light gauge pipe.

Referring now more particularly to Fig. 6, a shaft 12 which is journaled at its ends and driven by the gear train 3a, as above described, carries a hardened beveled disk 10, which is arranged to push one edge of the strip downwardly into a recess provided on the mating roll of the pair. A spacing unit 11 which is tapered at its end, provides a recess 12a, into which the other edge of the strip is upwardly pushed by the corresponding disk 10, of the mating roller, to form the other seam element. In order to provide for the use of strip of various widths, we provide a series of washers or spacers 14 (Fig. 6), adjacent the tapered end of the spacer 11, the whole unit being held in assembly by means of a nut engaging a thread on a shaft 12. It will be clear that if a wider strip is to be used, one or more of the washers or spacers 14 may be removed from the position shown, and inserted between the beveled disk 10 and the opposite end of the spacing unit 11, and it will, of course, be understood that a similar change is made on the mating roll of the pair.

Upon leaving the rolls, 8, 8', the strip has the cross sectional form shown in Fig. 9, and has the edges formed as indicated at 19. In order to corrugate a seam in the same pass as we prefer to do in the case of light gauges, and even for the purpose of seaming previously corrugated strip as in the case of heavier gauges, it is essential that one edge of the strip shown in Fig. 9 be definitely inclined to a U shape, or in other words, thrust toward the main body of the strip. This is necessary since it predetermines the direction of closing of the seam when pressure is applied thereto, and the seam is thus made to incline and close instead of opening up. For this purpose we provide the guides 13 and 15, of which the guide 15 is simply a straight side guide and the guide 13 is a hardened strip which is arranged to progressively bend the adjacent flange inwardly so as to form a U shape bead as indicated at 20 in Fig. 10.

Thus far this description has related to the preparatory forming of the strip, and we will now describe the forming assembly and the procedures carried out upon the strip at that point and subsequent thereto. Also driven from the drive 3a, is a pair of seaming rollers which are corrugated, and which in the case of light gauge material serve to corrugate the stock, and which in the case of heavier gauges merely serve to size the corrugations. In order to accommodate strips of different widths (bearing in mind that the strips when they reach the corrugated rollers, are already provided with seam elements) we provide a number of slots 16, to accommodate the flange 19 of the strip.

Figure 5:
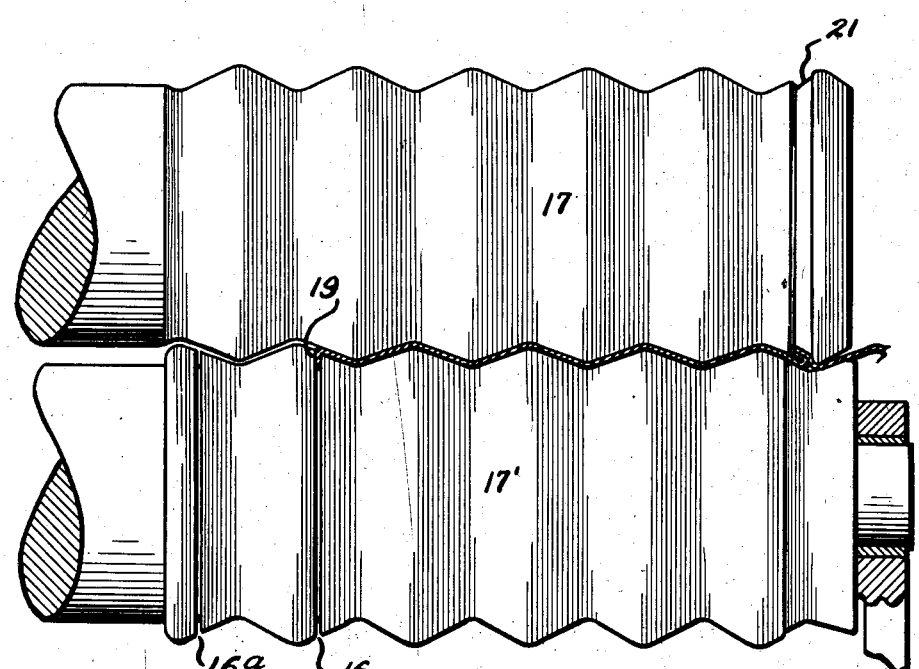
Fig. 5 is an elevational view of the seaming rolls.

Referring to Fig. 5, for example, a narrower strip would enter the corrugating rolls as there shown with the flange entering the slot 16, while a wider strip would enter the rolls with its flange entering the slot 16a. The rolls 17, 17' also perform the seaming operation, and to this end they are provided with the recesses shown at 21. It will be clear referring to Fig. 12, that as the strip is bent up over the roll 17, the flange 19 will arrive in a position to enter the bead 20, and as the engaged seam elements pass through between the rollers 17 and 17', the recessed portions 21 of the rollers provide necessary clearance space yet serve to compress and set the seam.

Figure 2:
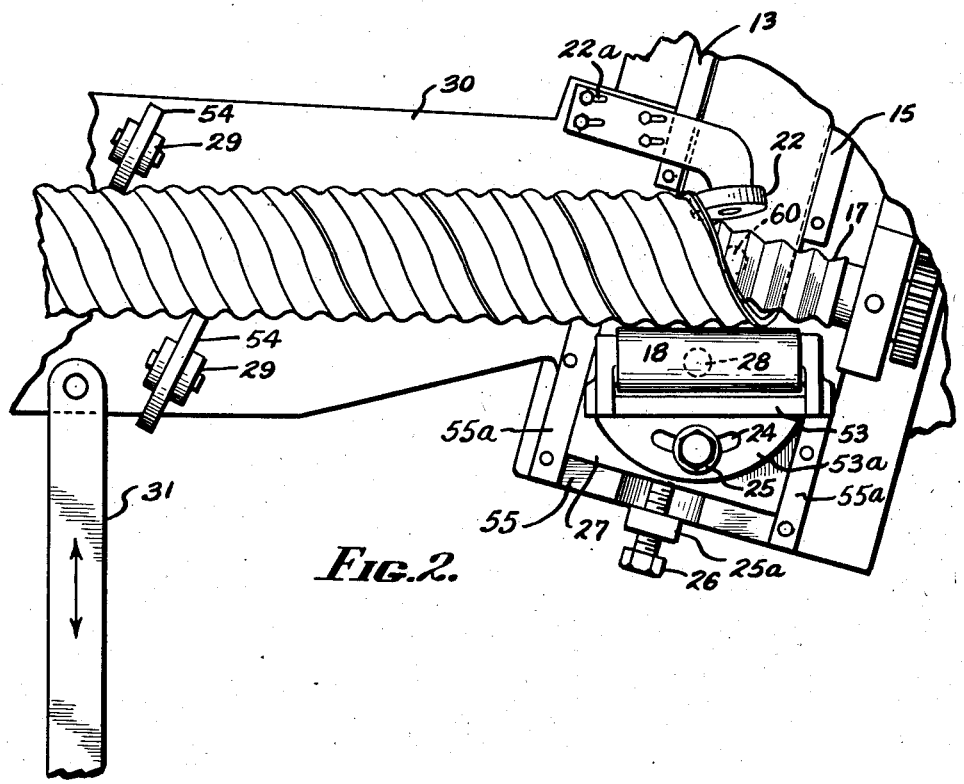
Fig. 2 is a partial plan view similar to Fig. 1, showing the arrangement for the manufacture of tapered pipe.

In order to insure that the flange properly engages in the bead, we provide a "hold-in" roller 22, shown in phantom lines in Fig. 12, and also observable in Figs. 1 and 2. This roller is mounted on a bracket 22a, which is conveniently attached in the angle at which the finished pipe is being delivered.

3. A method of manufacturing tapered helical lock seam pipe which includes the steps of forming similarly shaped oppositely disposed seam elements along the edges of a strip of metal, concurrently and progressively corrugating said strip, passing said strip between a pair of corrugated seaming rollers and bending the strip beyond said rollers helically to cause the leading end of said strip to pass around one of said rollers, continuously guiding said seam elements into interengagement, and passing said engaged seam elements again between said rollers to compress the same, and producing a taper in the pipe by gradually enforcing a change in the angle at which the finished pipe is being delivered.

4. That process of continuously fabricating lengths of tapered helical lock seam pipe, which includes the steps of forming seam elements along the edges of a strip of metal, helically winding said strip into pipe form with said seam elements in interengagement, compressing said seam, and tapering said pipe by gradually enforcing a change in the angle of delivery of the finished pipe in one direction for a predetermined period of time, cutting off a length of formed pipe, and then progressively enforcing a change in the angle of delivery of the finished pipe in the opposite direction for an equal length of time and again cutting off a length of pipe, whereby there are produced a series of lengths of pipe having equal small end and large end diameters and equal in length which are delivered in reversed positions for convenience in piling.

5. Apparatus for the manufacture of corrugated helical lock seam pipe comprising a plurality of pairs of rollers arranged to impart to a strip passing therethrough similar but oppositely disposed seam elements along the edges thereof, a pair of corrugated rolls arranged to corrugate the strip as it passes therethrough, means to impart to the strip a helical curvature, means for guiding the seam elements into interengagement as the leading end of the strip passes about one of said corrugating rolls, and means on said corrugating rolls for tightly compressing said seam.

6. Apparatus for the manufacture of corrugated helical lock seam pipe, comprising a plurality of pairs of rolls arranged to progressively corrugate a strip of metal, and concurrently, progressively to form along the edges thereof similarly shaped oppositely disposed seam elements, a pair of corrugated seaming rolls through which the strip is arranged to pass, means cooperating with said seaming rolls for helically curving said strip, whereby it will pass around one of said seaming rolls, means for guiding said seam elements into interengagement whereby said seam will be compressed as it passes again through said seaming rollers.

7. Apparatus for the manufacture of corrugated helical lock seam pipe comprising a plurality of pairs of rollers arranged to impart to a strip passing therethrough, similar but oppositely disposed seam elements along the edges thereof, a pair of corrugated rolls arranged to corrugate the strip as it passes therethrough, a cylindrical forming roll angularly disposed with respect to the corrugating rolls beyond the exit thereof and positioned to impart to the strip a helical curvature, means for guiding the seam elements into interengagement as the leading end of the strip passes about one of said corrugating rolls, and means on said corrugating rolls for tightly compressing said seam.

8. Apparatus for the manufacture of corrugated helical lock seam pipe, comprising a plurality of pairs of rolls arranged to progressively corrugate a strip of metal, and concurrently, progressively to form along the edges thereof similarly shaped oppositely disposed seam elements, a pair of corrugated seaming rolls through which the strip is arranged to pass, a cylindrical forming roll angularly disposed with respect to the corrugating rolls beyond the exit thereof and position to impart to the strip a helical curvature, whereby it will pass around one of said seaming rolls, means for guiding said seam elements into interengagement whereby said seam will be compressed as it passes again through said seaming rollers.

9. In a machine for manufacturing corrugated helical lock seam pipe, a forming and seaming assembly comprising a pair of corrugating and seaming rollers whose position is fixed, a curving roller disposed adjacent the exit of said corrugating and seaming rollers, the position of said curving roller as regards its distance from the seaming rollers and also as to its angular relation to said seaming rollers being adjustable, and supporting means for the formed pipe, said supporting means carrying said adjustable curving roller, said entire supporting means being mounted for oscillation about a point substantially at the intersection of the axes of said seaming rollers and of the formed pipe.

10. In a machine for manufacturing corrugated helical lock seam pipe from a strip of sheet metal, a pair of corrugated rolls through which the strip is adapted to pass, means for curving said strip helically to cause it to pass around one of said rolls, means on said rolls for causing said seam elements to interengage, and means for supporting the formed pipe, said curving means, seam engagement ensuring means and formed pipe supporting means being mounted for oscillation as a unit about a point coinciding substantially with the intersection of the axes of said rollers and said formed pipe.

11. In a machine for manufacturing corrugated helical lock seam pipe from a strip of sheet metal, a pair of corrugated rolls through which the strip is adapted to pass, means for curving said strip helically to cause it to pass around one of said rolls, means on said rolls for causing said seam elements to interengage, and means for supporting the formed pipe, said curving means, seam engagement ensuring means and formed pipe supporting means being mounted for oscillation as a unit about a point coinciding substantially with the intersection of the axes of said rollers and said formed pipe, said curving means being mounted for adjustment as to its angular position and as to its distance from said pair of rolls.

12. In a machine for manufacturing corrugated helical lock seam pipe from a strip of sheet metal, a pair of corrugated rolls through which the strip is adapted to pass, means for curving said strip helically to cause it to pass around one of said rollers, means for causing said seam elements to interengage, and means for supporting the formed pipe, said curving means, seam engagement ensuring means and formed pipe supporting means being mounted for oscillation as a unit about a point coinciding substantially with the intersection of the axes of said rollers and to the forming assembly frame 30. This roller holds the L-shaped flange on one side of the strip firmly in place against the bead on the other, as the helically curved strip is formed into pipe. If this roller bears firmly against the strip as shown, commercially uniform size pipe results.

Just beyond the rolls 17, 17', is mounted a forming roller 18. This forming roller is mounted on a bracket or holder 53, which bracket is fixed to a plate 53a. The plate 53a is arranged to be pivoted about a point 28 and an arcuate slot 24 and a bolt 25 are provided whereby the assembly may be bolted in any desired angular position in order to vary the size of the pipe. Preferably there is provided a graduated scale and a pointer as shown in Fig. 1. It will be clear that as the strip emerges from between the rollers 17, 17', and impinges upon the angularly disposed roll 18, it will be helically bent upwardly so that the strip continues to be helically wound, and through the cooperation of the roller 22, the seam elements will be interengaged as heretofore described.

It is also necessary that the location of the roller 18 be adjustable as to its in and out position with respect to the rolls 17, 17'. For this purpose the member 53a is carried upon the member 27, which as shown in Figure 8, is mounted in ways 55a upon the member 55. A block 25a is welded to the member 55, and has a threaded hole through which passes a bolt 26, having a portion of reduced diameter 26a, which is engaged in a fork 56, integral with the member 27. It will be clear that by rotating the bolt 26 in one direction, the assembly is moved inwardly, and by turning the bolt in the other direction the assembly is moved outwardly.

The plate 30 which is integral with member 55, therefore, carries, as has been described, both the rollers 18 and 22. As has been described, the roller 22 is mounted on the plate 30, and the roller 18 also mounted thereon is adjustable both as to its in and out position, and as to its angular position with respect to the plate 30.

For any given sized pipe, the roller 22 has a fixed position if the pipe is always made from the same width strip. Should a wider strip be used, the helix angle would of course be greater and roll 22 would have to be slightly adjustable in a direction along the axis of the main rolls 17.

Should a larger diameter pipe be made from the same strip, roll 22 must be moved out in order to bear against the strip. This adjustment is not necessary unless variations in diameter are so great that the roll does not bear against the strip.

The member 55 and plate 30, carried therewith are arranged for pivotal movement about a point 60. At a position removed from the forming area, the plate 30 preferably carries rollers 54 rotatably mounted in brackets 29. The brackets 29 are preferably rotatable with respect to the plate 30, in any desired manner. The rollers 54 which must be adjustable to take care of different diameter pipe, serve to hold the pipe in a fixed position with relation to the plate 30.

In order to make tapered pipe, it is necessary to continuously change the helical angle, and this we accomplish by means of a link 31, which may be connected to any desired cam or eccentric. As movement is imparted to the arm 31 to change the direction of movement of the formed pipe, the effect is to change the degree of engagement of the seam elements. This is possible in view of the fact that the roller 22 is also mounted on the plate 30. Thus if at the start of the operation the seam elements 19 and 20 are fully engaged, movement is imparted to the link 31 to increase the helical angle whereby a small amount of metal is taken away from the seam and the pipe diameter gradually increases. We have found that tapers on the order of 2 inches in 10 feet can thus be accomplished without deleteriously affecting the quality of the seam, and tapers such as we have just mentioned are adequate for use in pile shells.

It will be clear that by reversal of movement of the link 31, a taper will be imparted to the pipe in the opposite direction, and it will thus be seen that successive pieces of pipe formed will have increasing and then decreasing tapers, and the small end and large end diameters of successive pieces will be the same, but at opposite ends of the pipe. This is advantageous in that the lengths of pipe as formed are already reversed for piling or stacking.

It will be noted that the location at which the right hand edge of the strip (in the direction of strip movement) enters the forming rolls never changes, and if the strip is wider or narrower it will be the location of the left hand edge of the strip that will change. Therefore, the roller 22 will need but little adjustment since the actual seam forming operation will always be carried on at the same point and the roller 22 is near that point. It will also be noted that the form of the recesses 21 in the rolls 17, 17', is such that the seam in cross section has the appearance shown in Fig. 11, in which the offsets 23 and 23' are provided so that the seam cannot become disengaged. It will be clear that this seam is an extremely solid and fast seam.

It will be understood that various modifications may be made without departing from the spirit of our invention, and that therefore we do not intend to limit ourselves in any manner other than as pointed out in the claims which follow.

Having thus described our invention, what we claim as new and desire to secure by Letters Patent, is:

1. A method of manufacturing tapered helical lock seam pipe, which includes the steps of forming along the edges of a strip of metal oppositely disposed similarly shaped seam elements, slightly inclining one of said seam elements, passing the strip between a pair of seaming rollers, bending said strip beyond said seaming rollers into a helical form to bring the leading edge of said strip around one of said pair of seaming rollers, continuously guiding said seam elements into interengagement and compressing said seam, and producing a taper in the pipe by gradually enforcing a change in the angle at which the finished pipe is being delivered.

2. A method of manufacturing tapered helical lock seam pipe, which includes the steps of forming along the edges of a strip of metal similarly shaped oppositely disposed seam elements, deforming one of said seam elements, passing said strip through a pair of corrugating rolls to corrugate the same, bending the strip beyond said corrugating rolls in a helical direction to cause the leading end of said strip to pass around one of said corrugating rolls, continuously guiding the said seam elements into interengagement, the said engaged seam elements passing through said rolls to compress said seam, and producing a taper in the pipe by gradually enforcing a change said formed pipe, means for rocking said entire assembly slowly first in one direction and then in the other whereby to produce tapered pipe.

13. A method of manufacturing tapered helical lock seam pipe which includes the steps of forming along the edges of a strip of metal, oppositely disposed similarly shaped seam elements, passing the strip between a pair of seaming rollers, bending the said strip beyond said seaming rollers into helical form by an angularly related bending means to bring the leading edge of said strip around one of said pair of seaming rollers, continuously guiding said seam elements into interengagement and compressing said seam on said rollers, and producing a taper in the pipe by gradually enforcing a change in the angle at which the finished pipe is delivered, while concurrently varying the angle, but not the average distance, of said bending means from said seaming rollers.

EUGENE FAY.
TERRENCE W. ALLSWORTH.